(12) United States Patent
Wu et al.

(10) Patent No.: US 8,238,194 B2
(45) Date of Patent: Aug. 7, 2012

(54) METHODS AND SYSTEMS FOR COMPRESSING SONIC LOG DATA

(75) Inventors: Peter T. Wu, Missouri City, TX (US); Pierre Campanac, Sugar Land, TX (US); Shu-Kong Chang, Yokohama (JP); James G. L. Thompson, Perth (AU); Anshuman Sinha, Boca Raton, FL (US)

(73) Assignee: Schlumberger Technology Corporation, Sugar Land, TX (US)

( * ) Notice: Subject to any disclaimer, the term of this patent is extended or adjusted under 35 U.S.C. 154(b) by 481 days.

(21) Appl. No.: 11/566,600

(22) Filed: Dec. 4, 2006

(65) Prior Publication Data

US 2007/0097786 A1   May 3, 2007

Related U.S. Application Data

(63) Continuation-in-part of application No. 10/711,524, filed on Sep. 23, 2004, now abandoned.

(51) Int. Cl.
*G01V 1/00* (2006.01)
(52) U.S. Cl. .......................................................... 367/25
(58) Field of Classification Search ............... 367/25, 367/31–32, 41–46; 702/6
See application file for complete search history.

(56) References Cited

U.S. PATENT DOCUMENTS

| | | | |
|---|---|---|---|
| 4,509,150 A | 4/1985 | Davis | |
| 4,594,691 A | 6/1986 | Kimball et al. | |
| 4,698,793 A | 10/1987 | Wu | |
| 5,031,155 A * | 7/1991 | Hsu | 367/25 |
| 5,077,697 A * | 12/1991 | Chang | 367/31 |
| 5,278,805 A | 1/1994 | Kimball | |
| 5,381,092 A | 1/1995 | Freedman | |
| 5,594,706 A * | 1/1997 | Shenoy et al. | 367/76 |
| 5,608,214 A | 3/1997 | Baron et al. | |
| 5,684,693 A | 11/1997 | Li | |
| 5,852,587 A | 12/1998 | Kostek et al. | |
| 5,999,484 A | 12/1999 | Kimball et al. | |
| 6,084,826 A | 7/2000 | Leggett, III | |
| 6,160,919 A | 12/2000 | Hale | |
| 6,196,335 B1 * | 3/2001 | Rodney | 175/40 |
| 6,205,087 B1 * | 3/2001 | Fukuhara et al. | 367/69 |
| 6,405,136 B1 | 6/2002 | Li et al. | |
| 6,453,240 B1 | 9/2002 | Blanch et al. | |
| 6,462,542 B1 | 10/2002 | Venkataramanan et al. | |
| 6,614,360 B1 | 9/2003 | Leggett, III et al. | |
| 6,654,688 B1 | 11/2003 | Brie et al. | |
| 6,691,036 B2 | 2/2004 | Blanch et al. | |
| 6,748,329 B2 * | 6/2004 | Mandal | 702/14 |

(Continued)

OTHER PUBLICATIONS

Kimball, et al. "Semblance processing of borehole acoustic array data", Geophysics, vol. 49, No. 3, pp. 274-281, Mar. 1984.

(Continued)

*Primary Examiner* — Jack W Keith
*Assistant Examiner* — Krystine Breier
(74) *Attorney, Agent, or Firm* — Jianguang Du; Jody DeStefanis; Jeff Griffin

(57) ABSTRACT

Methods for compression of sonic log data include STC processing, sorting peak components in the sonic data; filtering the sorted peak components to remove high-frequency portions in the peak components; and decimating the filtered peak components according to a selected ratio to produce compressed data. One method for telemetry transmission of downhole sonic log data includes sorting peak components in the sonic log data; compressing the sorted peak components to produce compressed data; packing the compressed data to produce data packets for telemetry transmission; and sending the data packets using telemetry.

32 Claims, 13 Drawing Sheets
(10 of 13 Drawing Sheet(s) Filed in Color)

U.S. PATENT DOCUMENTS

| | | | |
|---|---|---|---|
| 6,801,922 B2 * | 10/2004 | Goszewski et al. | 708/313 |
| 6,868,341 B2 | 3/2005 | Valero | |
| 6,943,709 B2 | 9/2005 | Blanch et al. | |
| 6,990,045 B2 * | 1/2006 | Jackson | 367/81 |
| 2004/0145503 A1 | 7/2004 | Blanch et al. | |
| 2007/0223822 A1 * | 9/2007 | Haugland | 382/232 |

OTHER PUBLICATIONS

Kimball, Christopher V. "Shear slowness measurement by dispersive processing of the borehole flexural mode", Geophysics, vol. 63, No. 2, pp. 337-344, Mar.-Apr. 1998.

* cited by examiner

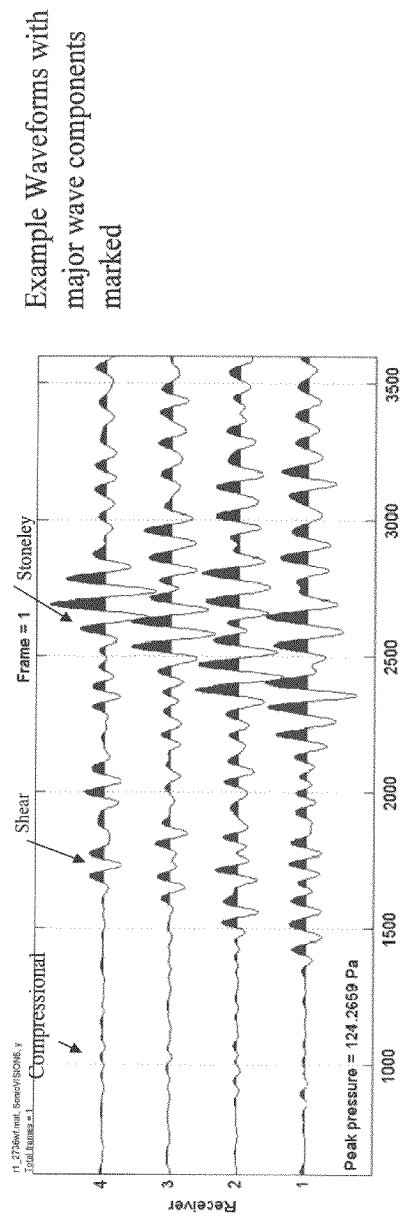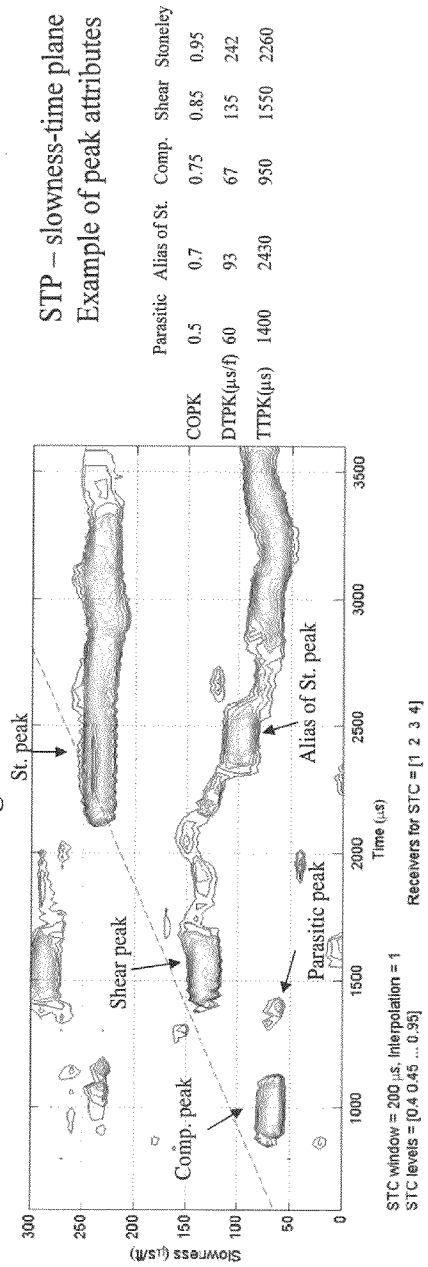

METHODS AND SYSTEMS FOR COMPRESSING SONIC LOG DATA

RELATED APPLICATIONS

This is a continuation-in-part of U.S. patent application Ser. No. 10/711,524, filed Sep. 23, 2004, which is hereby incorporated in its entirety by this reference.

FIELD

The invention relates generally to instruments for subsurface logging and exploration. More particularly, the invention relates to techniques for compressing log data for transmission via a selected telemetry format.

BACKGROUND

The oil and gas industry uses various tools to probe the formation penetrated by a borehole in order to locate hydrocarbon reservoirs and to determine the types and quantities of hydrocarbons. Among these tools, sonic tools have been found to provide valuable information regarding formation properties. In sonic logging, a tool is typically lowered into a borehole, either after the well has been drilled or while the well is being drilled, and sonic energy is transmitted from a source into the borehole and surrounding formation. The sonic waves that travel in the formation are then detected with one or more receivers.

A typical sonic log can be recorded on a linear scale of slowness versus depth in the borehole, and is typically accompanied by an integrated-travel-time log in which each division indicates an increment of one microsecond per foot of the total travel time for the sonic wave to travel one foot. Sonic logs are typically used as direct indications of subsurface properties or—in combination with other logs or other data of the subsurface properties—to determine the formation porosity and other parameters which cannot be measured directly.

Various analysis methods are available for deriving formation properties from the sonic log data. Among these, the slowness-time-coherence (STC) method is commonly used to process the monopole sonic signals for coherent arrivals, including the formation compressional, shear, and borehole Stoneley waves. See U.S. Pat. No. 4,594,691 issued to Kimball et al. and Kimball et al., Geophysics, Vol. 49 (1984), pp. 274-281.

For logging-while-drilling (LWD) sonic logging, it is desirable to send selected data uphole or wherever desired in real-time via mud pulse telemetry. Mud telemetry is a common method used in LWD operations to transmit log data to the surface. Mud telemetry makes use of the modulations of the pressure of a drilling fluid pumped through the drilling assembly to drill the wellbore. The fluid pressure modulation, however, can only transmit data at a rate of a few bits per second. A typical LWD sonic job requires too much bandwidth to transmit all the desired measured sonic data in real-time.

The limitations imposed on data transmission by a lack of adequate bandwidth are commonly encountered in various logging operations, not just sonic logging. Therefore, various methods for data compression have been developed to reduce the bandwidth requirement of conventional telemetry schemes. For example, U.S. Pat. No. 5,381,092 issued to Freedman describes methods for compressing data produced from NMR well tools. The methods first subdivide a plurality of input signals into multiple groups, where the number of groups is much less than the number of input signals. The method then generates one value for each group. Thus a plurality of values corresponding to the plurality of groups represent the compressed input signals transmitted uphole.

U.S. Pat. No. 5,031,155 issued to Hsu describes methods for compressing sonic data acquired in well logging. Samples of each digitized formation wave component are characterized as a vector. Eigenvectors based on the formation wave component vectors are obtained, and selected wave components are correlated to the eigenvectors to obtain scalar correlation factors. The eigenvectors and correlation factors together provide a compressed representation of the selected formation wave component.

U.S. Pat. No. 6,691,036 issued to Blanch et al. describes methods for processing sonic waveforms. A method proposed in this application transforms an acoustic signal into the acoustic frequency domain to produce an acoustic frequency domain semblance and display the result in a graph with slowness and acoustic frequency axes. Published U.S. Patent Application No. 2004/0145503 by Blanch et al. describes additional methods for processing sonic waveforms.

U.S. Pat. No. 6,405,136 B1 issued to Li et al. describes compression methods for use in wellbore and formation characterization. The method includes performing a 2D transform on the data in the orientation domain and in a domain related to the recording time.

While these methods are useful in compressing log data and in reducing the bandwidth requirements of mud telemetry, a need remains for efficient techniques for downhole data compression.

SUMMARY

One aspect disclosed herein relates to methods for compression of sonic log data. A method in accordance with one embodiment includes STC processing, sorting peak components in the sonic log data; filtering the sorted peak components to remove high-frequency portions in the peak components; and decimating the filtered peak components according to a selected ratio to produce compressed data.

Another aspect disclosed herein relates to methods for telemetry transmission of downhole sonic log data. A method in accordance with one embodiment includes sorting peak components in the sonic log data; compressing the sorted peak components to produce compressed data; packing the compressed data to produce data packets for telemetry transmission; and sending the data packets using telemetry.

Yet another aspect disclosed herein relates to systems for compressing sonic log data. A system in accordance with one embodiment includes a processor and a memory, wherein the memory stores a program having instructions for: sorting peak components in the sonic log data; filtering the sorted peak components to remove high-frequency portions in the peak components; and decimating the filtered peak components according to a selected ratio to produce compressed data.

The patent or application file contains at least one drawing executed in color. Copies of this patent or patent application publication with color drawings will be provided by the Office upon request and payment of the necessary fee.

FIG. 14A-14B show waveforms with major wave components marked and results of STC having contour plots of coherence in STP with attributes for each selected peak.

DETAILED DESCRIPTION

Embodiments disclosed herein relate to techniques for compressing downhole data (e.g., attributes of sonic coherence peaks). These compression schemes may be used to reduce telemetry bandwidth requirements for sending data uphole (e.g., in LWD operations) or to reduce the memory required for storing data for later retrieval (e.g., in logging-while-tripping operations). Embodiments herein may be implemented in existing downhole tools (e.g., sonic instruments or other logging tools) or incorporated with future instruments to transmit real-time information where desired. Sonic tools are available for wireline, while-tripping, long-term monitoring, and LWD operations as known in the art. Sonic tools for LWD logging, for example, are described in U.S. Pat. No. 5,852,587 issued to Kostek et al. When used for sonic implementations, the disclosed techniques are applicable to acoustic wave data produced in all modes of excitation (e.g., monopole, dipole, quadrupole, octupole).

Figure 1:
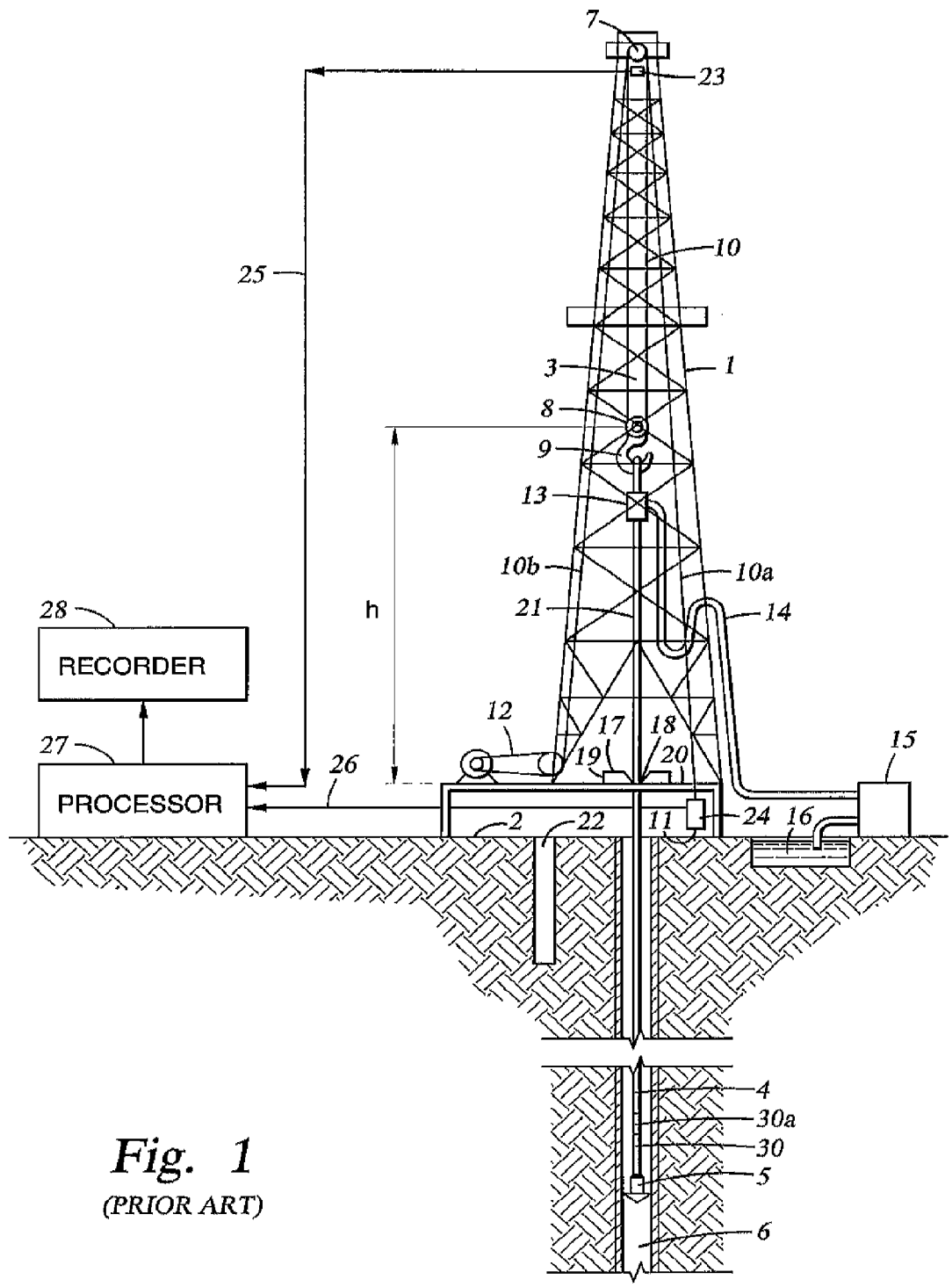
FIG. 1 shows a prior art logging-while-drilling system having a tool disposed in a borehole.

FIG. 1 shows a general illustration of a drilling rig and a drill string with a downhole logging tool in a borehole. The rotary drilling rig shown comprises a mast 1 rising above ground 2 and is fitted with a lifting gear 3. A drill string 4 formed of drill pipes screwed one to another is suspended from the lifting gear 3. The drill string 4 has at its lower end a drill bit 5 for drilling the well 6. Lifting gear 3 consists of crown block 7, the axis of which is fixed to the top of mast 1, vertically traveling block 8, to which is attached hook 9, cable 10 passing round blocks 7 and 8 and forming, from crown block 7, on one hand dead line 10a anchored to fixed point 11 and on the other active line 10b which winds round the drum of winch 12.

Drill string 4 is suspended from hook 9 by means of swivel 13, which is linked by hose 14 to mud pump 15. Pump 15 permits the injection of drilling mud into well 6, via the hollow pipes of drill string 4. The drilling mud may be drawn from mud pit 16, which may be fed with surplus mud from well 6. The drill string 4 may be elevated by turning lifting gear 3 with winch 12. Drill pipe raising and lowering operations require drill string 4 to be temporarily unhooked from lifting gear 3; the former is then supported by blocking it with wedges 17 in conical recess 18 in rotating table 19 that is mounted on platform 20, through which the drill string passes. The lower portion of the drill string 4 may include one or more tools, as shown at 30, for investigating downhole drilling conditions or for investigating the properties of the geological formations. Tool 30 shown is an acoustic logging tool having at least one transmitter and a plurality of receivers spaced therefrom.

Variations in height h of traveling block 8 during drill string raising operations are measured by means of sensor 23 which may be an angle of rotation sensor coupled to the faster pulley of crown block 7. Weight applied to hook 9 of traveling block 8 may also be measured by means of strain gauge 24 inserted into dead line 10a of cable 10 to measure its tension. Sensors 23 and 24 are connected by lines 25 and 26 to processing unit 27 which processes the measurement signals and which incorporates a clock. The processing unit computes from the data to produce the depth of the drill bit and the depth of the tool sensor measurement points. Each depth is associated with the time measured from the clock. Recorder 28 is connected to processing unit 27, which processing unit is preferably a computer. In addition, the downhole sonic tool 30 may include a processing unit 30a. The downhole processing unit 30a and/or the surface processing unit 27 may be used to perform the data compression and decompression in accordance with embodiments of the invention.

The electronics in the downhole sonic tool (30) comprises a clock. In logging while drilling, usually data acquisition occurs at preprogrammed time intervals based on the downhole clock. Therefore, each data acquisition has an acquisition time. During drilling or tripping, the tool is moving, so that each acquisition time is associated with a data acquisition, or measurement depth. For example, if the bit penetration rate is 100 ft/hour, and the data is acquired at 18 second intervals, then the data is acquired every 0.5 ft. At each acquisition time the tool, and so the receivers, are at a specified depth.

At each acquisition time, the sonic transmitter fires and the acoustic signals propagating through the borehole and the formation are acquired at receivers which are spaced from the transmitter. When necessary, at the acquisition time, the transmitter may also fire rapid succession of pulses and the received signals are stacked to improve the signal-to-noise ratio. The acquired acoustic signals at the receivers are usually expressed in waveforms. Waveforms are signal amplitudes versus acoustic time. Acoustic time is the time after the transmitter firing. The length of the acoustic time for each acquisition can be decided according to the slowness (inverse of velocity) of the waves and the distance they travel. For example, for a wave with slowness of 200 microseconds/ft and source receiver spacing of 15 ft, the acoustic time length will need to be more than 3 milliseconds. Typically, 10 milliseconds acoustic time length is suitable for most situations, although longer acoustic time length can sometimes be used for some applications.

The acquisition time and acoustic time are therefore different in scale and meaning. In this application, the term "time" will generally refer to acquisition time unless specified to be acoustic time. In addition, the term "frequency" will generally refer to Fourier transforms of data related to acquisition frequency unless specified to be acoustic frequency. Since acquisition time is related to depth of acquisition, "spatial frequency" will be related to acquisition time. The term "slowness-time" refers to acoustic time.

Sonic waveforms, as shown in FIG. 14A, are typically analyzed with the slowness-time-coherence (STC) method. This method systematically computes the coherence (C) of the signals in acoustic time windows, which start at a given acoustic time (T) and have a given window moveout slowness (S) across the array. As shown in FIG. 14B, the 2D plane C(S,T) is called the slowness-time plane (STP). The coherent arrivals in the waveforms will show up in the STP as prominent coherent peaks. The three attributes of a coherent peak are the peak coherent value (COPK) and the peak location in the slowness-time plane (DTPK and TTPK). The attributes of these prominent coherent peaks represent the condensed information extracted from the recorded waveforms. The attributes show the coherence, acoustic arrival time, and propagation slowness of the prominent wave components detected from the waveforms.

The peak attributes can be used uphole as input to a selection process called "labeling" to determine the compressional (P), shear (S), and Stoneley (St) slowness logs. The peak attributes can also be used to generate a synthetic slowness-time-plane projection (STPP) for real-time quality control purposes. In any given zone, if the compressional DT log matches to a group of peaks with high coherence, steady DT value, and consistent arrival time, the likelihood of accurate measurement is high. Here, DT and slowness are used interchangeably. In order to accommodate the mud telemetry bandwidth, the downhole software, for example, onboard a sonic tool, can select only a few peaks (e.g., 4 peaks) to transmit uphole. First, the software would search for coherent peaks above a given threshold value (usually 0.4) in the STP. There may be a large number of peaks that have coherence above this threshold. The software would then sort the peaks according to descending order of coherence and retain only the top peaks (e.g., top 4). For the example in FIG. 14B, the four peaks retained are compressional, shear, Stoneley (labeled as St. peak), and alias of Stoneley peaks. The parasitic peak is not chosen because it is the fifth one.

The bandwidth required to send the 4 highest coherent peaks uphole is significant. The following table shows the number of bits required to represent typical coherence attributes of a single peak.

|  | Peak attributes | | |
| --- | --- | --- | --- |
|  | COPK | DTPK | TTPK |
| Bit assignment | 3 | 7 | 4 |

It requires 14 bits to represent one peak and 56 bits for 4 peaks at any given data frame. Assuming the data frame rate (i.e. acquisition time interval) is 10 second per frame, the bit rate requirement for sending the attributes of the 4 peaks uphole is 5.6 bits/sec, which can exceed the available telemetry capacity for most field jobs.

The disclosed methods can compress data with little loss of information. Under normal circumstance, a compression factor of 4 can be achieved without significant loss of information. A reduction (data compression) by a factor of 4 will make the telemetry rate requirement for sending data via mud telemetry possible for many applications. For example, with a factor of 4 compression, the peak attributes of 4 peaks can be transmitted at 1.4 bits/sec for 10-second frame rates (i.e. acquisition time interval).

Figure 2A:
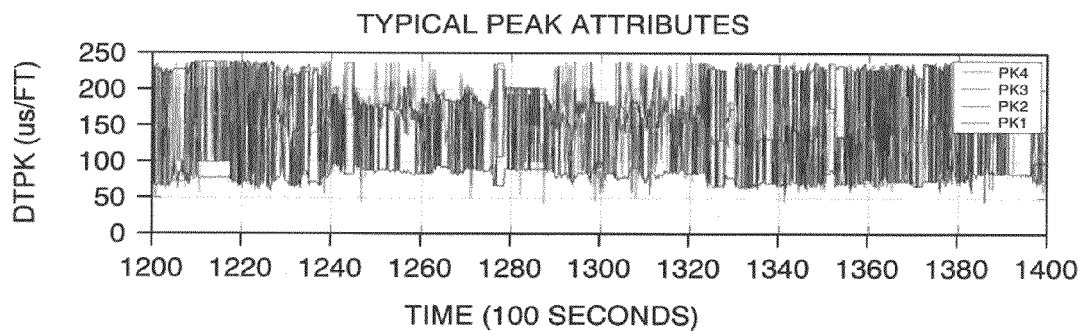
FIGS. 2A-2C show sonic log data derived coherence peak attributes as calculated by a prior art slowness-time-coherence method.
Figure 2B:
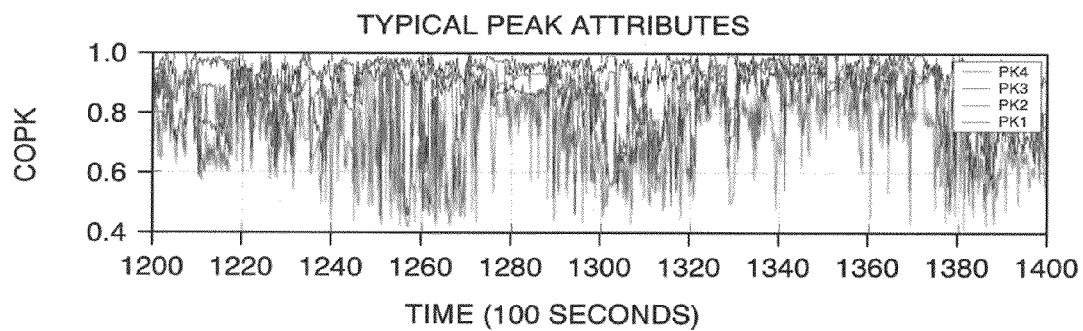
Figure 2C:
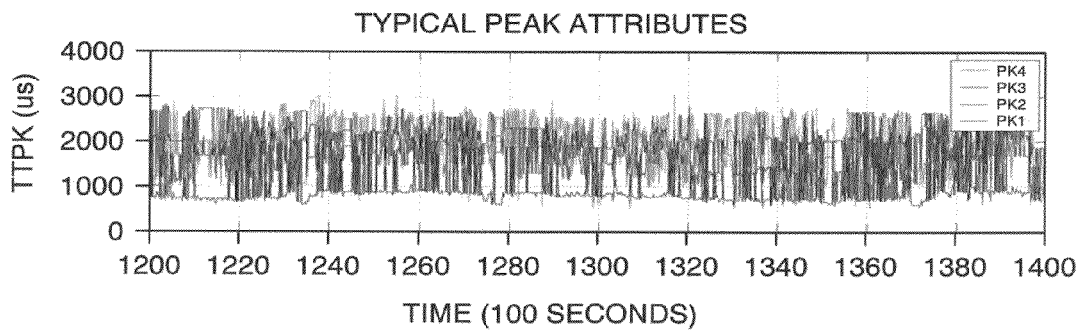

FIGS. 2A-2C show peak attributes of DTPK, COPK, and TTPK, respectively, as functions of acquisition time from a typical sonic job. These peaks are typically sorted by coherences, which are not identified with any major wave component. For example, the P component may have the highest coherence in a given data frame, while the St component may have the highest coherence in the next frame. As a result, the peak attributes as functions of time, as shown in FIGS. 2A-2C, appear to be random distributions of noises. This is especially true for DTPK (FIG. 2A) and TTPK (FIG. 2C), which are important information in a sonic log. Thus, the coherence sorted peak attributes may not be the most desirable method for handling the sonic data.

It is apparent from FIGS. 2A-2C that, without proper sorting, the peak attributes are fill of high frequency components. From the signal processing point of view, high frequency data require wide bandwidth to represent them adequately, and, therefore, it would be difficult to compress high frequency data. In practice, high frequency component of the peak attributes may not be removed without loosing much information.

Sonic tools are designed to measure slowness of major wave components regardless of coherence, and the high frequency components in the coherence sorted peak attribute data typically are not related to the major wave components. Thus, the real information of interest does not require high frequency representations. Furthermore, the receiver arrays of conventional sonic tools typically span a few feet (e.g., a 2-ft [0.61 m] aperture) along the longitudinal axis of the tool, and the measured slowness of the wave components is typically averaged over the receiver aperture. Essentially, the 2-ft [0.61 m] aperture acts like a low-pass filter, removing high-frequency components. Therefore, the measured P, S, and St slownesses should be slowly varying functions in both the acquisition time domain and the depth domain.

Figure 3:
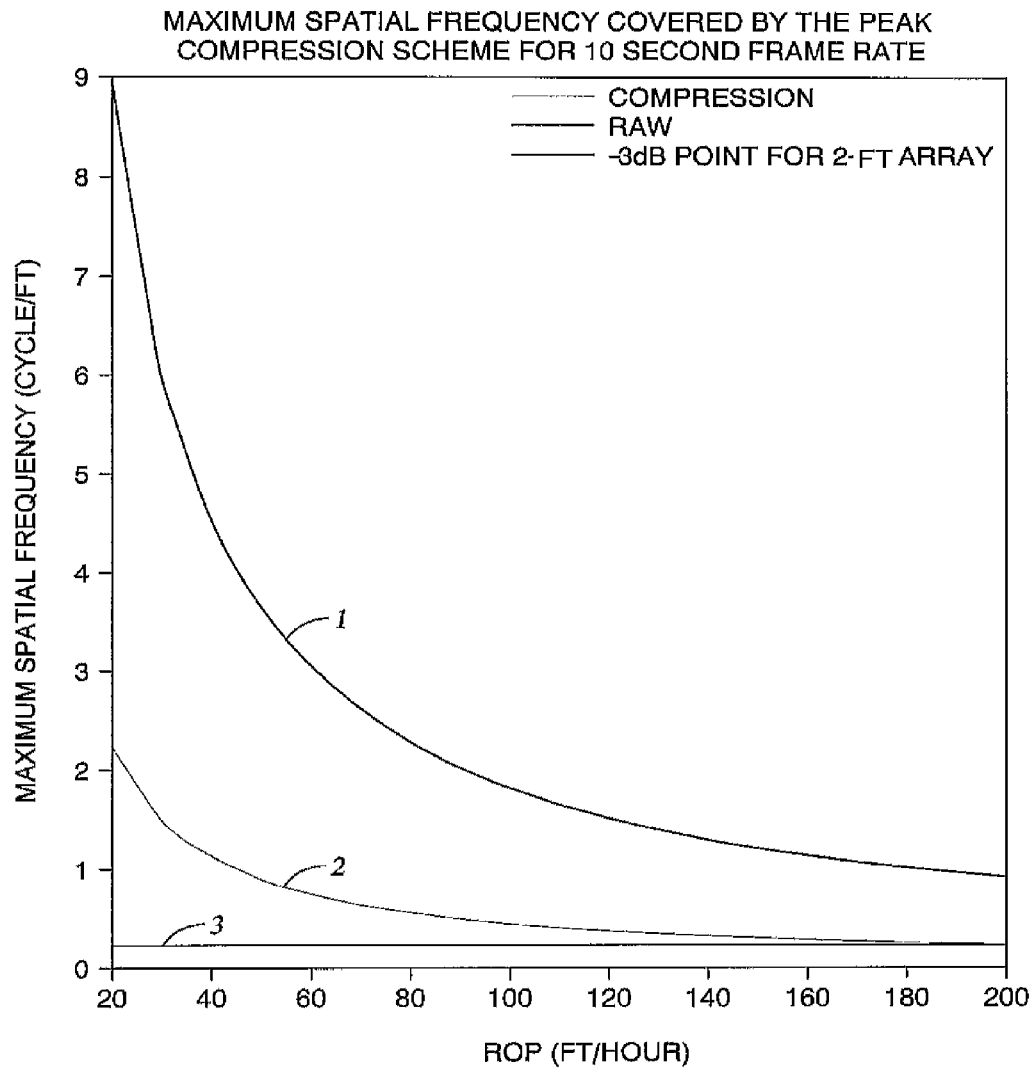
FIG. 3 shows a plot of maximum spatial frequency as a function of drilling speed.

The spatial resolution of a sonic log is limited to the array length used in the STC processing. For example, if the receiver array is 2 ft long, then it is difficult to resolve variations within the span much less than 2 ft. In other words, there is not much useful information from the high frequency portion in the spatial frequency domain. FIG. 3 is for illustration purpose in which there is a line (curve 3) of −3 dB cutoff frequency point with a 2 ft receiver array resolution (3), a curve (curve 1) for spatial sampling frequency versus rate of penetration (ROP) for 10 second acquisition sample rate (frame rate), and a curve (curve 2) for the re-sampled (decimated) spatial sampling frequency for the compression following the principles disclosed herein. Curve 1 shows the sampling frequency (cycle/ft) for a drilling process with an ROP ranging from 20-200 ft/hr (6.1 to 61 m/hr). Curve 1 clearly shows that the spatial sampling frequency decreases substantially as the ROP increases. The sampling frequency is clearly high above curve 3 even at the highest ROP in the figure. The new sampling frequency with the proposed compression method disclosed herein, as shown in curve 2, still stays above curve 3 for the entire ROP range in the figure. Therefore, the compression preserves most of the information of interest.

Since the acquisition with a preset acquisition time interval normally contains sampling frequencies higher than necessary, it is advantageous to transmit only the lower frequency portion of the log data. The important information content of the log is typically included in the lower portion (e.g. lower 25%) of the spatial frequency spectrum. Therefore, a compression scheme (e.g., a band limited data compression scheme), which keeps only the lower portion (e.g. 25%) of the spatial frequency, should have minimal loss of information. Curve 2 represents the lower 25% of the spatial frequency. Thus, by keeping only the lower portion of the spatial frequency, the data are effectively compressed by a factor of four, without a significant loss of information.

The above observations suggest that sonic log data can be efficiently compressed without loss of much information by keeping mostly the low frequency components. In addition, it may be advantageous to sort the peak attributes according to the peak components, rather than the magnitudes of the coherences. Based on these considerations, embodiments herein present techniques for effective data compression that can be implemented in a downhole tool to reduce the telemetry bandwidth requirements or to reduce the memory requirement for storing log data for later retrieval.

Figure 4:
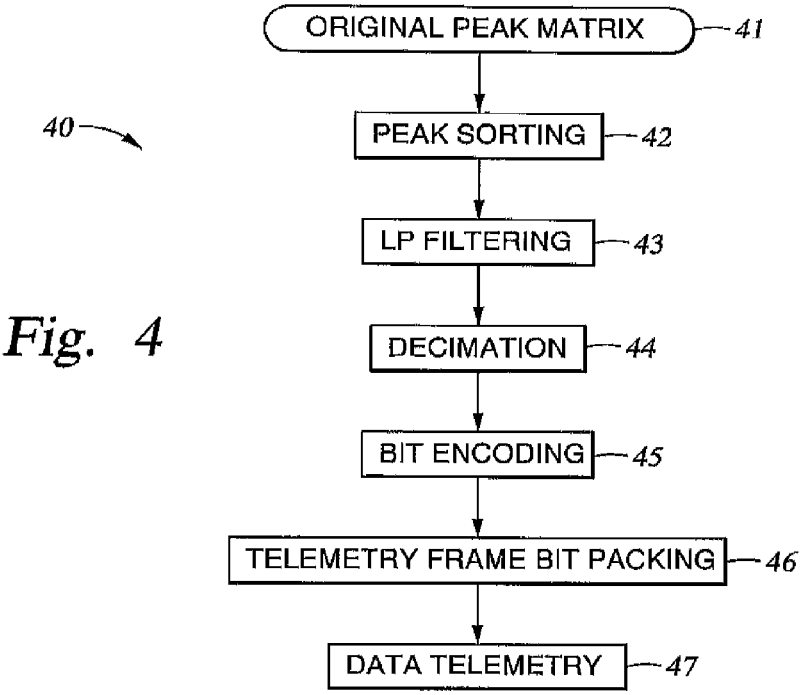
FIG. 4 shows a method for data compression in accordance with one embodiment herein.

Methods disclosed herein for data compression are based on sorting of the peak attributes according to wave components, rather than according to coherences. FIG. 4 shows a block diagram of a compression method 40 in accordance with one embodiment disclosed herein. The peak attributes of original peak matrix 41 are first sorted, according to the wave components, into P, S, St, and other waves (step 42). After these peak attributes are sorted, a low-pass filter may be applied to each peak component to filter out the high frequency bands (e.g., to cut off the top 75% frequency bands) (step 43). The low-pass filter is applied across the time frame. The low pass filtered peak attributes are then decimated (resampled) to compact the data (step 44). A decimation ratio for use in a method herein preferably matches the total frequency band to low-pass filter pass -band ratio. For example, if a low pass filter is used to cut off the top 75% frequency bands, then a 4:1 ratio is preferred for the decimation. Steps 43 and 44 effectively remove the higher frequency portion of the peak attributes. One of ordinary skill in the art will appreciate that these two steps are for illustration only, and other methods may be used to achieve the. same results. For example, the peak attributes in each sorted peak component may be sorted in the frequency domain and the high frequency portions discarded.

Once the peak attributes have been filtered and decimated (resampled), the remaining portion is ready for transmission uphole. The data that are to be transmitted may be encoded in a suitable bit-encoding format for mud telemetry (or other telemetry) (step 45). For example, one may assign 3 bits to encode the magnitudes of peak coherences, 7 bits to DT, and 4 bits to TT. Next, the encoded bits are packed in frames (data packets) for telemetry transmission (step 46) and the data packets are sent where desired (step 47).

Figure 5:
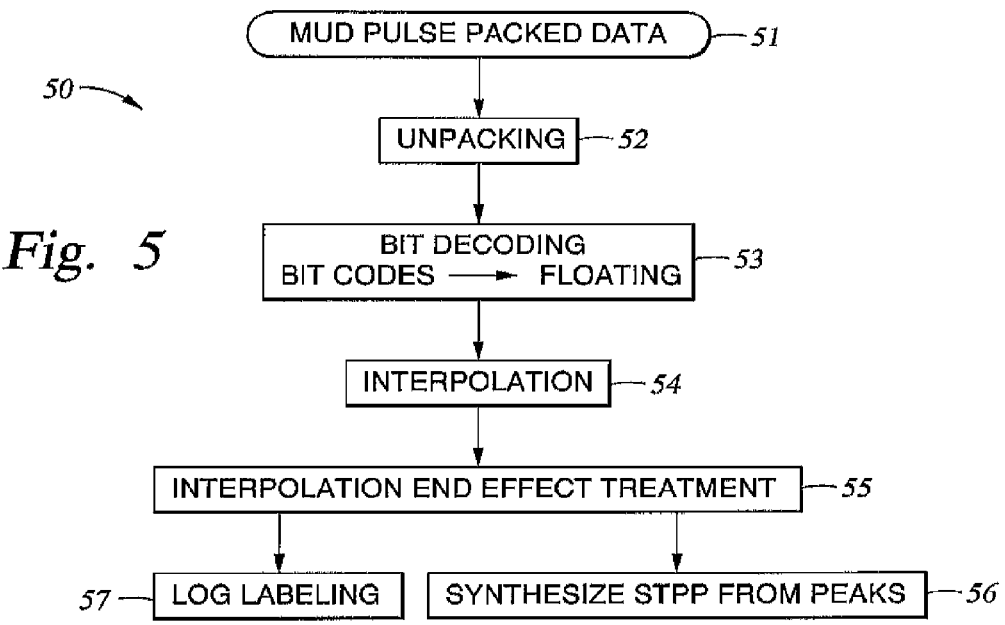
FIG. 5 shows a method for data decompression in accordance with one embodiment disclosed herein.

Once the compressed data are sent to the surface, they can be decompressed to "reconstruct" the peak attributes in a process that in most part is a reverse of the compression process used to compress the data. FIG. 5 shows a method of decompression 50 in accordance with one embodiment of the invention. First, the encoded bits from the telemetry container (e.g., the mud pulse packed data 51) are unpacked to restore the decimated peak matrix structure (step 52). Then, the bits are decoded to recover the decimated peak attributes (step 53). The decimated peak attributes are then interpolated to "reconstruct" the peak attributes (step 54). The interpolation may be accomplished with any method known in the art, for example by harmonic interpolation. The interpolation ratio preferably matches the ratio used to compress the data (see step 44 in FIG. 4). The last few data points from the interpolation may have artifacts. These artifacts may be minimized (or removed) by overlapping the last few points with the next data set (step 55). Once these peak attributes are "reconstructed", they may be used to synthesize STPP (step 56) or to label the sonic logs DTc, DTs, DTst (step 57).

Note that the specific methods described in FIG. 4 and FIG. 5 are for illustration only. One of ordinary skill in the art will appreciate that variations of these processes are possible without departing from the scope of the invention. For example, the specific reference of the lower 25% of the spatial frequency and the 4-to-1 decimation described are values that work well for conventional LWD sonic tools. However, other percentages and/or decimation ratios may also be used to implement the disclosed schemes. That is, techniques disclosed herein are not limited to any specific frequency band and/or decimation ratio.

FIG. 4 and FIG. 5 outline the general schemes for data compression and decompression. Details of the steps involved are described below.

Peak Sorting According to Wave Components: P, S, St, O (other)

One of ordinary skill in the art will appreciate that there are many ways to sort the peaks according to the wave components. The following describes a simple procedure that has been found to work quite robustly on field data.

The wave component peak selection process may be based on factors that reflect peak characteristics. For example, the following factors may be used for peak selection: (a) Coherence, (b) Slowness consistent with acoustic arrival time for the given transmitter-to-receiver spacing (TR), (c) Early acoustic arrival (for P component only), and (d) Late acoustic arrival (for St component only). Bach of these factors may be associated with a weighting coefficient to yield a cost function for that factor. The total cost function may then be described as the sum of the cost functions for the individual factors.

In sonic logging, the first signal to arrive at a receiver is generally the compressional wave (P-wave), which travels from the transmitter to the receiver through the formation adjacent the borehole. The second signal arrival is generally the shear wave (S-wave). Then, the Stoneley wave (St) comes next. Because the P-wave comes earlier, it would be easier to sort out the P components first. Thus, in accordance with one embodiment herein, the lowest cost peak for P component is determined first. Then, the lowest cost peak for the S component is selected from the remaining peaks. The lowest cost peak for the St component is determined next from the remaining peaks after P and S peak selection. Finally, the remaining peaks after the P, S, and St peak selection are labeled "O" for "others."

In addition, other rules may be used in conjunction with the selection rules outlined above. For example, the P peaks may be preferentially selected from those having slowness within a practical limit, such as the compressional label limits that are part of the downhole tool configuration parameters. Similarly, the S peaks may be preferentially selected from those having a slowness typically expected of a shear wave. The St peaks may also be preferentially selected from those having slowness higher than the mud slowness.

Sometimes, the P component peak may be missing from the STC processing for a few frames. This situation may arise from a faulty peak search algorithm or noise problems. When the P component is missing, the sorting algorithm may incorrectly assign the S peak as the P peak over these few frames. If this happens, the resulting P peak slowness may have a spike (anomaly) over these few frames. To improve the situation, a de-spiking process may be included in P peak sorting to detect any spike. A spike may be defined as an anomaly having a width of a few frames. Such a spike can be detected, for example, by using a suitable filter. If a P spike is detected, the P peak attributes may be reassigned to a median value. After de-spiking, the attributes of the S, St, and O peaks may be reassigned from the original peak attributes using the minimum cost and slowness range rules.

In accordance with some embodiments herein, the peak sorting algorithm (and peak de-spiking algorithm) may be implemented in any suitable software. The peak sorting algorithm may include a quality indicator to indicate the quality of the wave-component peak sorting. A quality indicator may be based on the cost function described above, or any other suitable function. One of ordinary skill in the art will understand how to implement appropriate algorithm codes in accord with the techniques disclosed herein.

Band-limited Compression/Decompression for the Wave Component Sorted Peak Attributes The wave-component-sorted peak attributes are slowly varying functions with information content primarily in the lower 25% of the frequency band. Therefore, in accordance with some embodiments herein, a standard band limited compression algorithm may be selected to compress the sorted peak attributes. For example, an acquisition time domain version of the band-limited compression may be used. However, one of ordinary skill in the art will appreciate that other approaches may be used without departing from the principles discussed herein.

In accordance with one embodiment, an acquisition time domain based band-limited compression algorithm is used. The algorithm consists of low-pass filtering, followed by a four-to-one (or any other suitable ratio) decimation (see e.g., FIG. 4). The corresponding decompression step then uses a one-to-four (or other ratio corresponding to the compression ratio) harmonic interpolation to "reconstruct" the peak attributes. Harmonic interpolation assumes cyclic data and, therefore, artifacts (end point truncation effect) may appear at the end of data set. Several approaches may be used to eliminate this truncation artifact. For example, the last 4 points (if one-to-four decompression is used) of the interpolated data may be overwritten by the first 4 points of the next interpolated record, and the next record may be generated from an overlapped input that includes a repeated last data point of the last record.

In accordance with some embodiments, a quality indicator may be derived to provide indication of the quality of the compression. For example, a quality indicator may be based on the ratio of the spectral energy in the lower 25% of the frequency band to that in the upper 75% of the frequency band to indicate the quality of the compression.

The following examples illustrate the utility of methods in accordance with embodiments disclosed herein as applied to actual sonic log data.

Results from Sonic Data

Figure 6A:
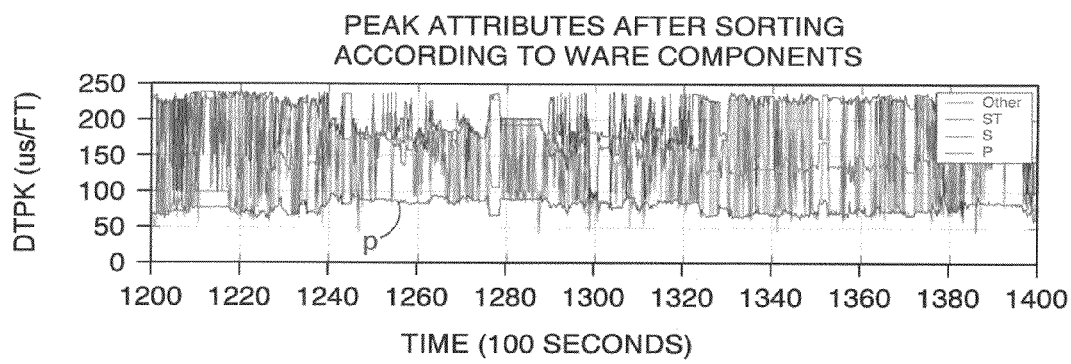
FIGS. 6A-6C show peak attributes after sorting of peak components in accordance with one method disclosed herein.
Figure 6B:
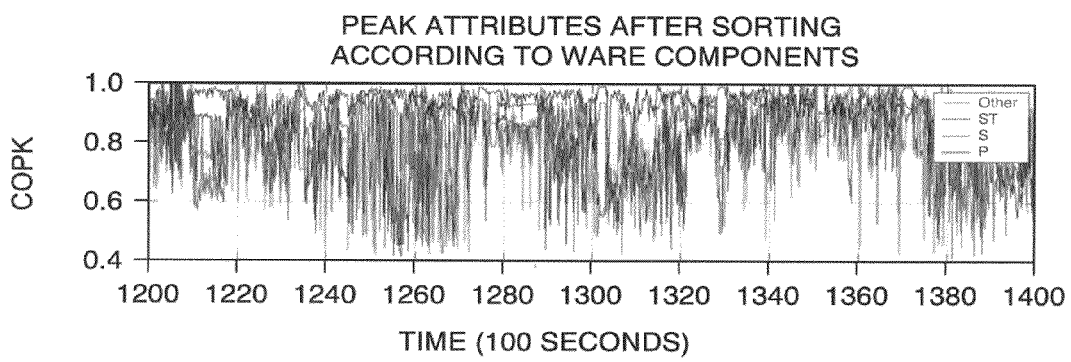
Figure 6C:
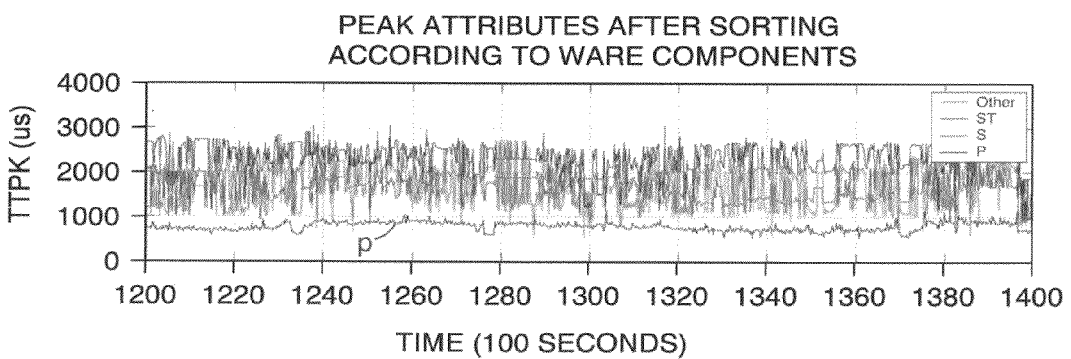
Figure 7A:
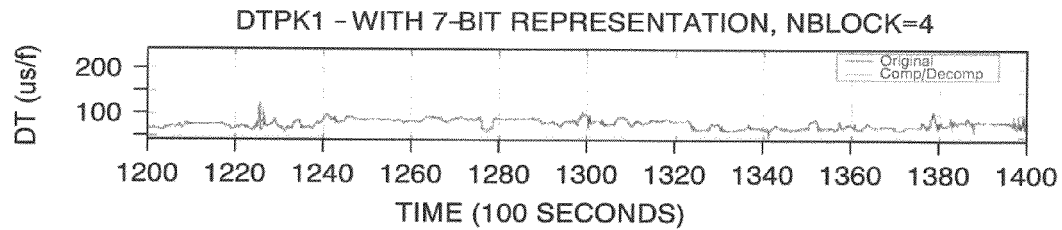
FIGS. 7A-7D show comparisons in the acquisition time domain between the original DTPK peak attributes and the compressed-decompressed DTPK peak attributes in accordance with one embodiment herein.
Figure 7B:
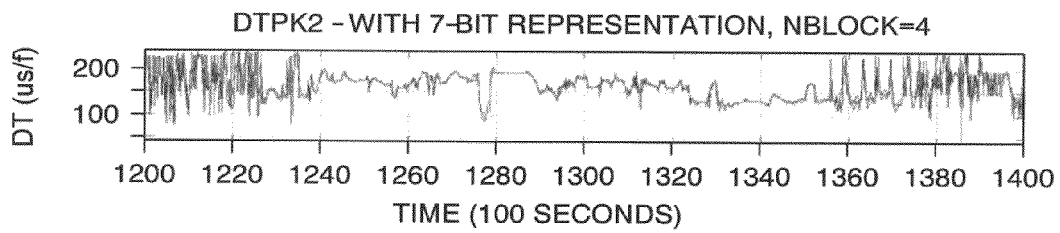
Figure 7C:
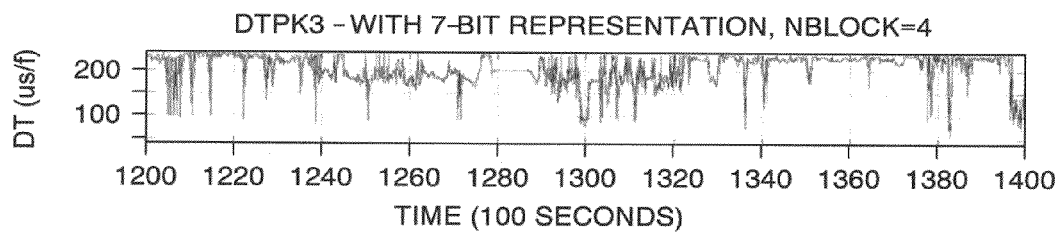
Figure 7D:
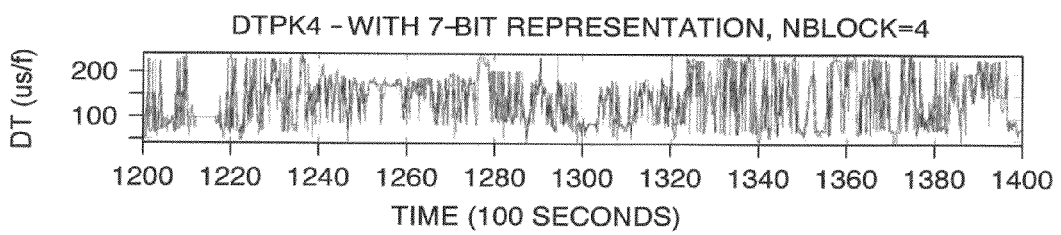

FIGS. 6A-6C show the wave-component-sorted peak attributes of sonic data from a Texas well. The wave-component-sorted peak attributes shown in FIGS. 6A-6C correspond to the same data shown as coherence-sorted peak attributes in FIG. 2. Note that the slowness (CTPK; FIG. 6A) and travel time (TTPK; FIG. 6C) of the P peak are very slowly varying low frequency data. There are a few places where the P peak attributes exhibit square-wave types of changes. These changes are typically due to rapid movements of the drill pipe during pipe change operations.

Similarly, as shown in FIGS. 6A-6C, the S and St peak attributes are also slowly varying signals over the zones where the S and St components exist. The O peak attributes generally retain the higher frequency form. This is expected because the O peaks are generally due to noise. In the compression process, the high frequency information of the attributes of the O peaks is lost and, therefore, the decompressed (reconstructed) attributes are smoother. In some embodiments herein, the O peak attributes may be skipped in telemetry transmission so as to reduce the telemetry bandwidth requirement if desired.

Figure 8A:
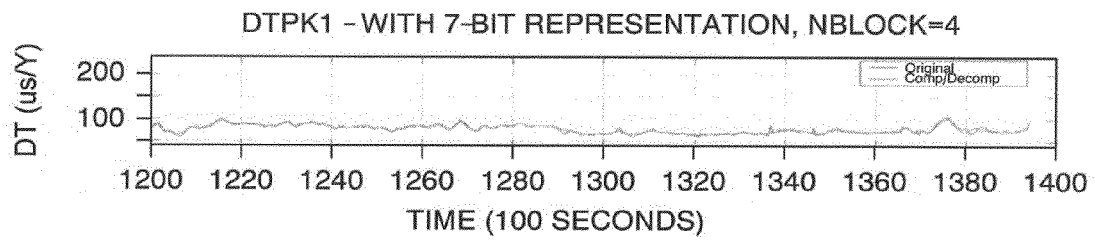
FIGS. 8A-8D show comparisons in the depth domain between the original DTPK peak attributes and the compressed-decompressed DTPK peak attributes in accordance with one embodiment herein.
Figure 8B:
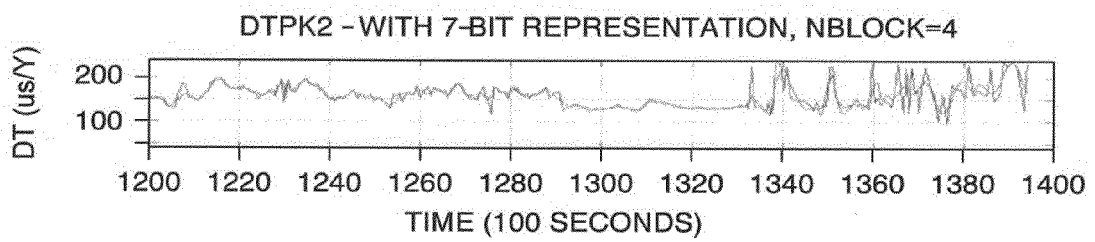
Figure 8C:
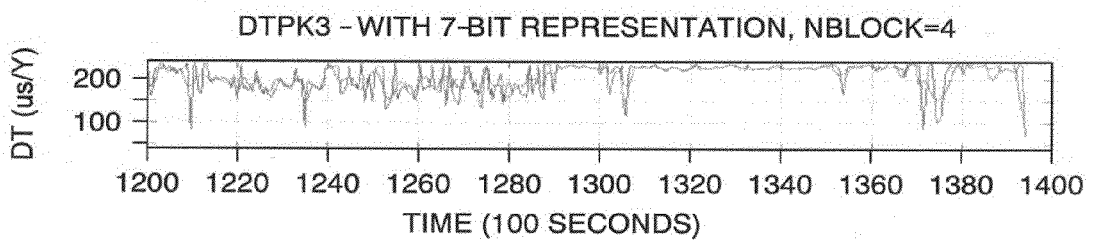
Figure 8D:
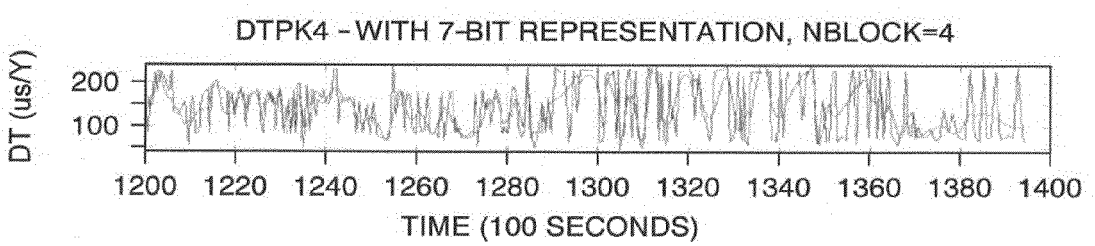
Figure 9A:
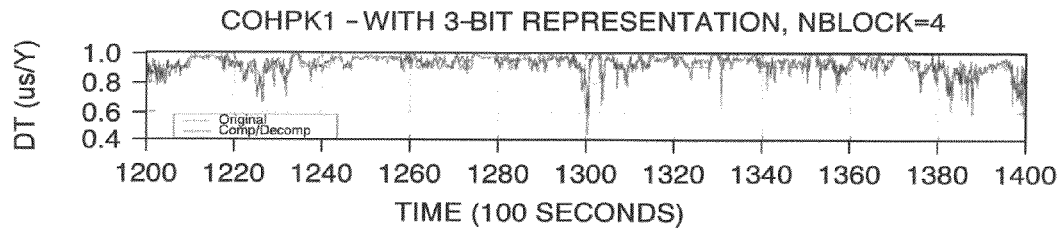
FIGS. 9A-9D show comparisons in the acquisition time domain between the original COPK peak attributes and the compressed-decompressed COPK peak attributes in accordance with one embodiment herein.
Figure 9B:
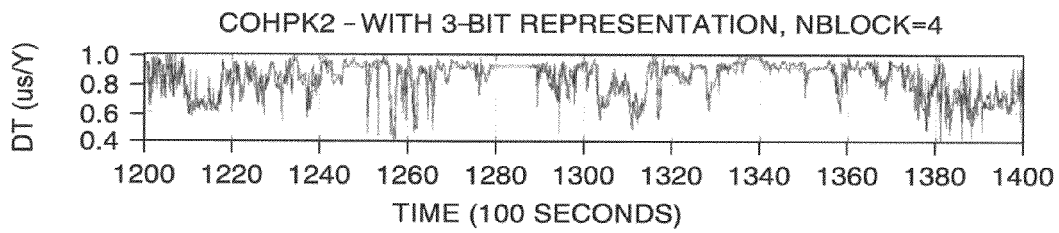
Figure 9C:
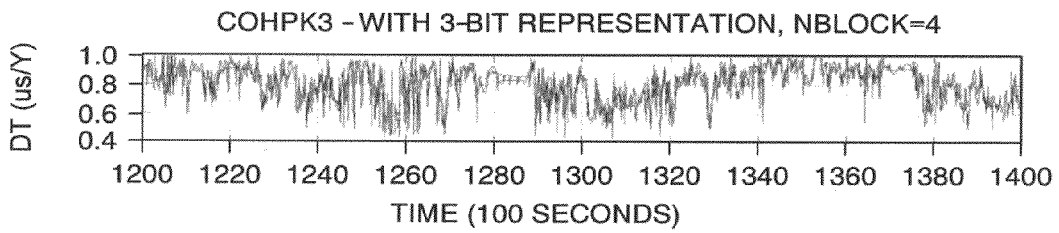
Figure 9D:
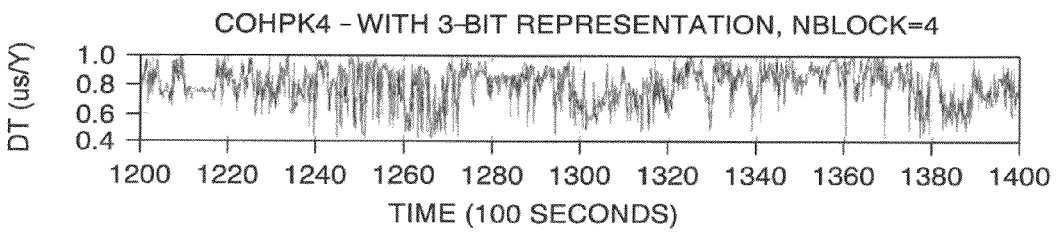
Figure 10A:
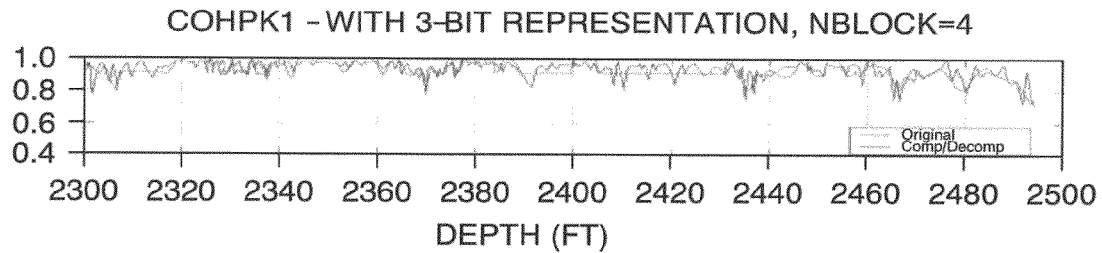
FIGS. 10A-10D show comparisons in the depth domain between the original COPK peak attributes and the compressed-decompressed COPK peak attributes in accordance with one embodiment herein.
Figure 10B:
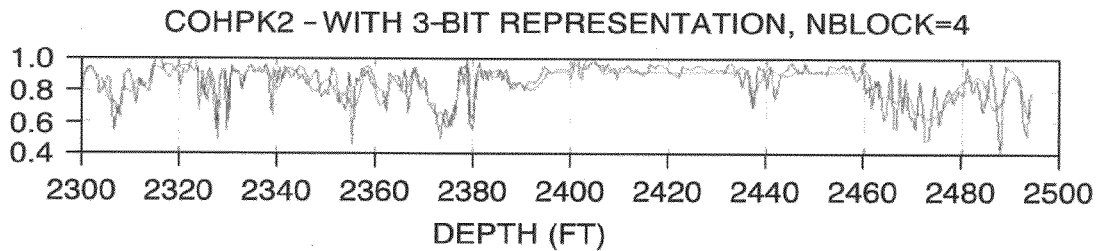
Figure 10C:
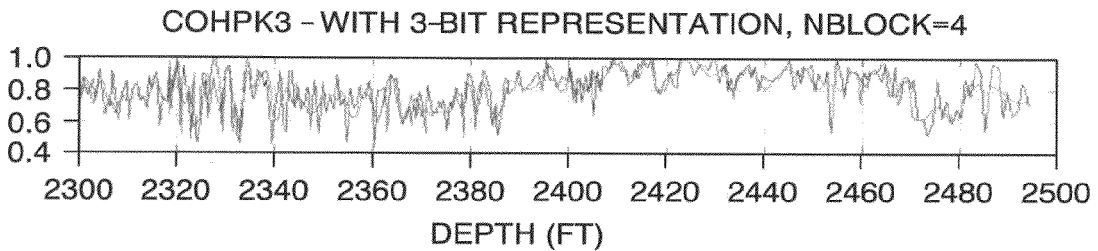
Figure 10D:
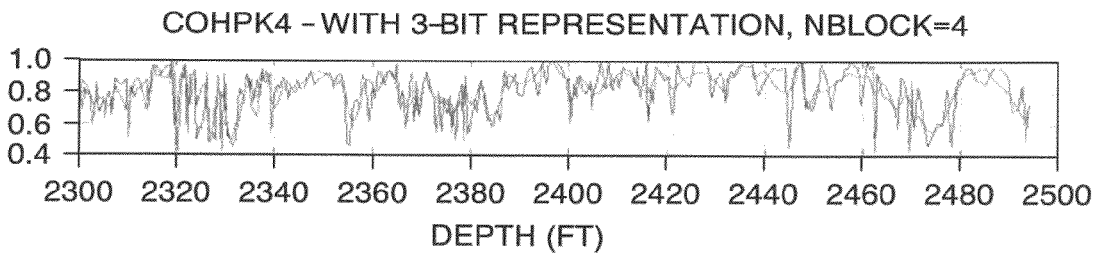
Figure 11A:
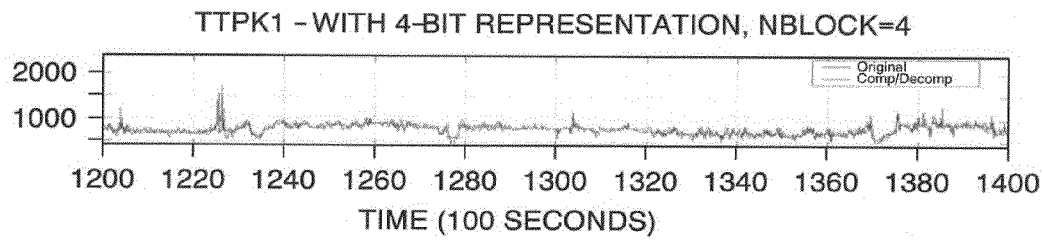
FIGS. 11A-11D show comparisons in the acquisition time domain between the original TTPK peak attributes and the compressed-decompressed TTPK peak attributes in accordance with one embodiment herein.
Figure 11B:
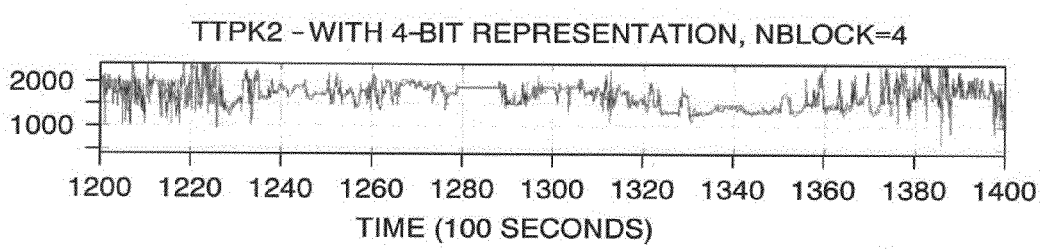
Figure 11C:
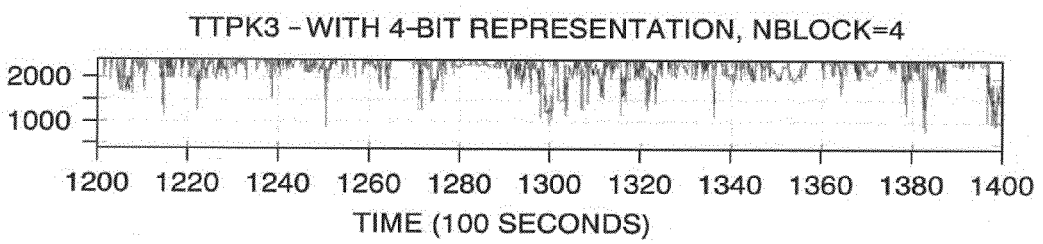
Figure 11D:
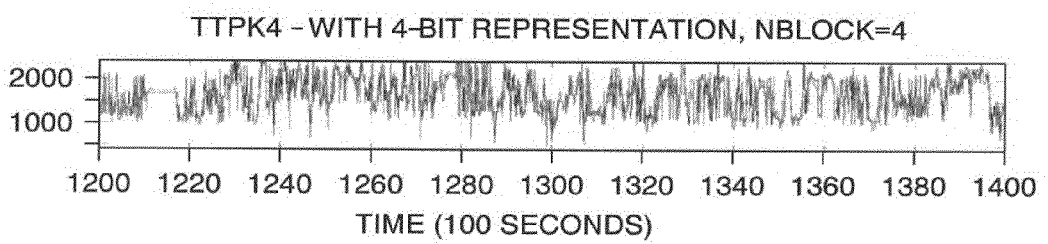
Figure 12A:
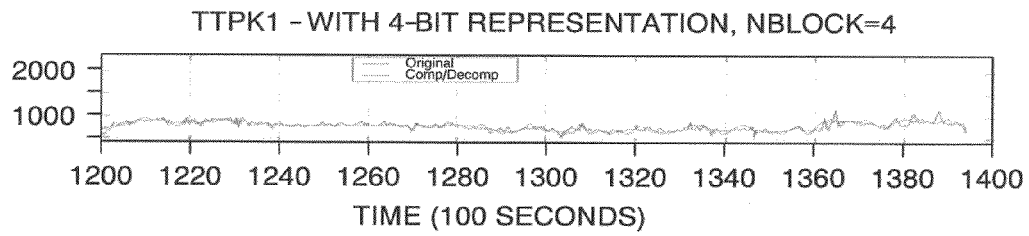
FIGS. 12A-12D show comparisons in the depth domain between the original TTPK peak attributes and the compressed-decompressed TTPK peak attributes in accordance with one embodiment disclosed herein
Figure 12B:
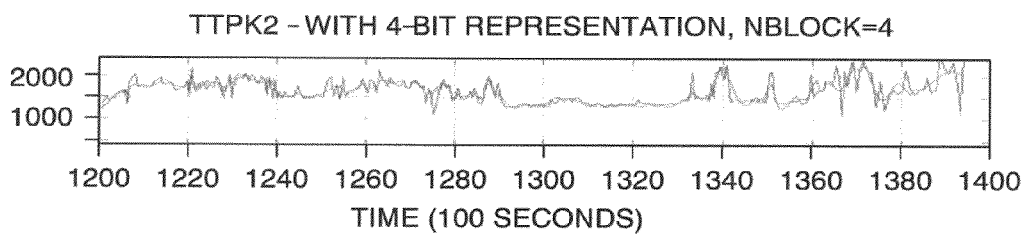
Figure 12C:
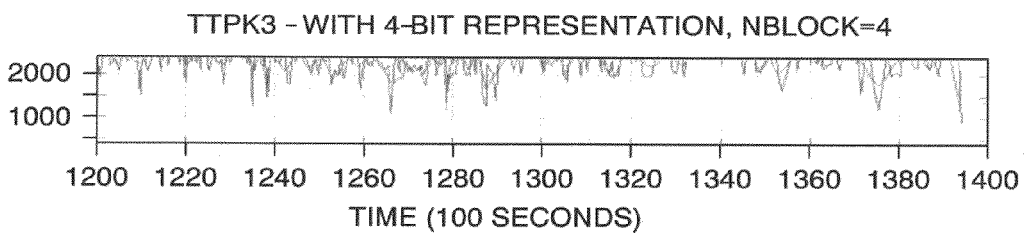
Figure 12D:
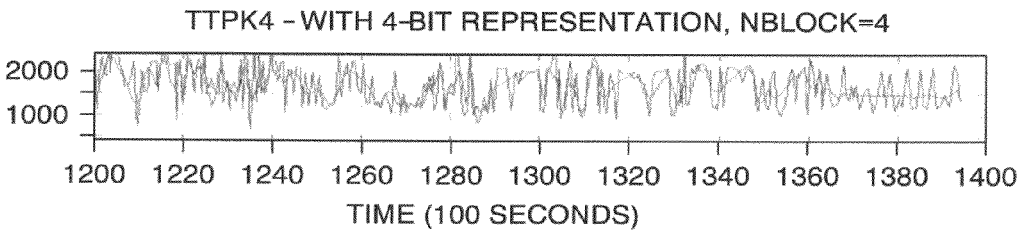

FIGS. 7A-7D respectively show comparisons between the original wave-component-sorted DTPK attributes and the compressed/decompressed DTPK for the P, S, St, and O peaks. The data in FIGS. 7A-7D are still in acquisition time domain. After converting to the depth domain, the same comparisons are shown in FIGS. 8A-8D. The matches between the original and the compressed/decompressed data for the P peak are excellent (see FIG. 7A; FIG. 8A). These comparisons show that there is practically no loss in information due to the compression and decompression. For the S peaks (FIG. 7B; FIG. 8B) and St peaks (FIG. 7C; FIG. 8C), the matches are also very good over the zones where these wave components exist.

Similarly, FIG. 9 and FIG. 10 respectively show comparisons between the original wave-component-sorted COPK attributes and the compressed/decompressed COPK attributes in the time and depth domains. In each Figure, panels (A)-(D) respectively correspond to the P, S, St, and O peaks. It is apparent that good matches are observed between the original wave-component-sorted and the compress/decompressed attributes, suggesting very little loss of information with the disclosed compression and decompression techniques.

FIG. 11 and FIG. 12 respectively show a comparison between the original wave-component-sorted TTPK attributes and the compressed/decompressed TTPK attributes in the time and depth domain. In each Figure, panels (A)-(D) respectively correspond to the P, S, St, and O peaks. Again, these comparisons show that very little information is lost with the compression and decompression techniques of the invention.

Figure 13A:
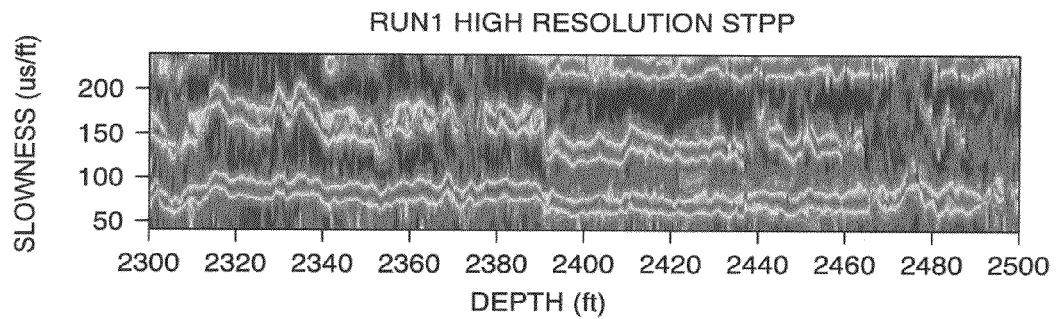
FIGS. 13A-13C show original STPP as compared with peak attributes before and after compression and decompression in accordance with one embodiment herein.
Figure 13B:
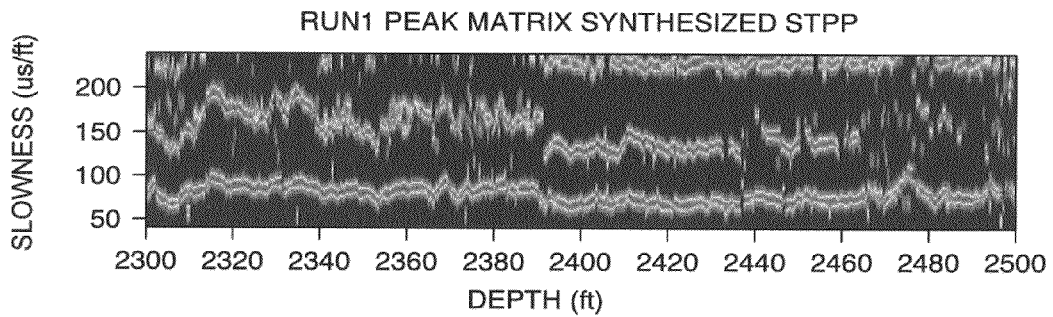
Figure 13C:
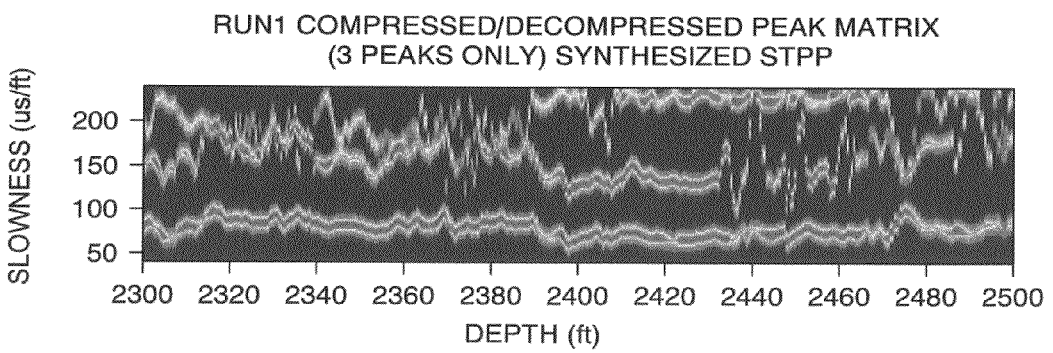

FIGS. 13A-13C show comparisons among the high-resolution recorded mode STPP plot (FIG. 13A), STPP synthesized from the original peak attributes (FIG. 13B), and STPP synthesized from the compressed/decompressed peak attributes (FIG. 13C). In this particular example, only 2 bits were assigned to represent the COPK attributes. Also plotted on the STPP are the wave-component-sorted DTPK for the P and S peaks. It is apparent that the STPP from the compressed-decompressed data matches well with that from the original peak attributes over the zones where the wave components exist. Over some small gaps of missing wave components, the compressed-decompressed data actually produce smoothed curves bridging over the gaps. Thus, sonic data compressed and decompressed using the principles disclosed herein produces more smoothed images by "interpolating" the missing peaks.

Some embodiments herein relate to systems for performing methods of the invention. One system may be implemented on the processor in the downhole tool or on a surface processor, which may be a general purpose computer. The computer includes a display, a main unit, and input devices such as a keyboard and a mouse. The main unit may include a central processor and a memory. The memory may store programs having instructions for performing methods of the invention. Alternatively, other internal or removable storage may be used, such as a floppy disk, a CD ROM or other optical disk, a magnetic tape, a read-only memory chip (ROM), and other forms of the kind known in the art or subsequently developed. The program of instructions may be in object code or source codes. The precise forms of the program storage device and of the encoding of instructions are immaterial here.

Some advantages of embodiments disclosed herein include methods for effective data compression without significant loss of information. The disclosed compression techniques are based on characteristics of the data to preserve the information content of the original data. The compression methods in accord with some embodiments may enable real-time transmission of downhole data that would otherwise be impossible to transmit using mud telemetry. Embodiments herein may also be used to compress data to minimize telemetry bandwidth requirements. Embodiments may also be used to compress data downhole for storage, in order to save memory. The saved data may then be retrieved for later processing (e.g. when the instrument is tripped out of the well).

While aspects of the invention have been described with respect to a limited number of embodiments, those skilled in the art, having benefit of this disclosure, will appreciate that other embodiments can be devised which do not depart from the scope of the following claims. For example, while mud telemetry is described as a transmission means herein, those skilled in the art will appreciate that other telemetry means may be used to implement the disclosed techniques. For the purposes of this specification it will be clearly understood that the word "comprising" means "including but not limited to", and that the word "comprises" has a corresponding meaning.

What is claimed is:

1. A method for compression of sonic log data, comprising:
    firing a transmitter at a time or depth measured from a clock;
    receiving sonic data at the time or depth;
    processing the sonic data with a processor for wave components;
    sorting the wave components of the processed sonic data with the processor wherein sorting the wave components comprises sorting for compressional wave (P-wave), shear wave (S-wave), and Stoneley wave (St-wave) components;
    low-pass filtering, with the processor, the wave components based on time or depth of acquisition from the clock;
    decimating, with the processor, the filtered sorted wave components; and
    generating, with the processor, compressed wave component data based on the decimating of filtered sorted wave components,
    wherein the sorting is performed prior to the low-pass filtering and the decimating.

2. The method of claim 1, further comprising identifying peaks from the processing.

3. The method of claim 1, wherein the sorting the wave components comprises sorting peak components.

4. The method of claim 1, wherein the processing uses slowness-time-coherence (STC) processing.

5. The method of claim 1, wherein sorting comprises sorting for the P-wave component, the S-wave component, and the St-wave component in a sequential order.

6. The method of claim 1, wherein sorting involves rules based on expected slowness ranges for peak components.

7. The method of claim 3, wherein sorting the peak components comprises correcting peak spikes due to noise in the sonic log data.

8. The method of claim 1, wherein the low-pass filtering is selected to cut off a top 75% frequency in the sorted wave components.

9. The method of claim 1, wherein a ratio of the decimating is four to one.

10. The method of claim 1, wherein the sorting, the filtering, and the decimating are performed in a downhole tool.

11. The method of claim 10, further comprising sending the compressed wave component data uphole via telemetry.

12. The method of claim 11, wherein sending the compressed wave component data uphole comprises encoding the wave compressed data.

13. The method of claim 11, wherein the telemetry comprises mud telemetry.

14. A method for telemetry transmission of downhole sonic log data, comprising:
    processing sonic data to identify wave components of peaks;
    sorting the wave components of the peaks wherein sorting the wave components comprises sorting for compressional wave (P-wave), shear wave (S-wave), and Stoneley wave (St-wave) components;
    low-pass filtering the wave components of the peaks based on time or depth of acquisition measured from a clock;
    decimating the filtered sorted wave components of the peaks to produce compressed data; and
    sending the compressed data using telemetry system, the compressed data keeping the wave components of interest at the time or depth,
    wherein the sorting is performed prior to the low-pass filtering and the decimating.

15. The method of claim 14, wherein the processing uses slowness-time-coherence (STC) processing.

16. The method of claim 14, wherein sorting comprises sorting for the P-wave component, the S-wave component, and the St-wave component in sequential order.

17. The method of claim 14, wherein sorting involves rules based on expected slowness ranges for peak components.

18. The method of claim 15, wherein sorting the peak components comprises correcting peak spikes due to noise in the sonic log data.

19. The method of claim 14, wherein the low-pass filtering is selected to cut off a top 75% frequency in the sorted wave components.

20. The method of claim 14, wherein a ratio of the decimating is four to one.

21. The method of claim 14, further comprising unpacking data packets to regenerate the compressed data; and decompressing the regenerated compressed data to reconstruct components.

22. The method of claim 21, wherein decompressing comprises interpolating the regenerated compressed data.

23. A system for compressing sonic log data, comprising:
    means for processing sonic data;
    means for identifying peaks from the processed sonic data;
    means for sorting wave components of the peaks wherein sorting the wave components comprises sorting for compressional wave (P-wave), shear wave (S-wave), and Stoneley wave (St-wave) components;
    means for low-pass filtering the wave components of the peaks based on time or depth of acquisition measured from a clock;
    means for decimating filtered sorted wave components of the peaks; and
    means for generating compressed data based on decimated wave components of the peaks, wherein the sonic data are acquired with a downhole logging tool of a drillstring in a borehole, wherein the sorting, the filtering, and the decimating are performed in the downhole logging tool, and wherein the sorting, the low-pass filtering, and the decimating are performed in that order.

24. The system of claim 23, further comprising a processor and memory means, wherein the memory means stores a program and data for:

processing sonic data;

identifying peaks from the processed sonic data;

sorting wave components of the peaks;

low-pass filtering wave components of the peaks based on time or depth of acquisition;

decimating filtered sorted wave components of the peaks; and generating compressed data based on decimated wave components of the peaks.

25. The system of claim 23, wherein the sorting means comprises means for sorting peak wave components.

26. The method of claim 1, wherein the sonic data are acquired with a downhole logging tool of a drillstring in a borehole.

27. The method of claim 2, wherein the peaks are used uphole to determine compressional wave (P-wave), shear wave (S-wave), and Stoneley wave (St-wave) components.

28. The method of claim 2, wherein the peaks are used to generate a synthetic slowness-time-plane projection (STTP) for real-time quality control purpose.

29. The method of claim 15, wherein the peaks are used uphole to determine compressional wave (P-wave), shear wave (S-wave), and Stoneley wave (St-wave) components.

30. The method of claim 15, wherein the peaks are used to generate a synthetic slowness-time-plane projection (STTP) for real-time quality control purpose.

31. The method of claim 24, wherein the peaks are used uphole to determine compressional wave (P-wave), shear wave (S-wave), and Stoneley wave (St-wave) components.

32. The method of claim 24, wherein the peaks are used to generate a synthetic slowness-time-plane projection (STTP) for real-time quality control purpose.

* * * * *